United States Patent
Kishiyama et al.

(10) Patent No.: US 8,693,428 B2
(45) Date of Patent: Apr. 8, 2014

(54) MOBILE STATION, BASE STATION, AND METHOD OF TRANSMITTING AN UPLINK SCHEDULING REQUEST

(75) Inventors: Yoshihisa Kishiyama, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 315 days.

(21) Appl. No.: 12/304,688

(22) PCT Filed: Jun. 13, 2007

(86) PCT No.: PCT/JP2007/061935
§ 371 (c)(1),
(2), (4) Date: Feb. 26, 2009

(87) PCT Pub. No.: WO2007/148586
PCT Pub. Date: Dec. 27, 2007

(65) Prior Publication Data
US 2009/0290570 A1 Nov. 26, 2009

(30) Foreign Application Priority Data

Jun. 19, 2006 (JP) .................................. 2006-169453
Jan. 9, 2007 (JP) .................................. 2007-001859
Feb. 5, 2007 (JP) .................................. 2007-026182

(51) Int. Cl.
*H04W 4/00* (2009.01)
(52) U.S. Cl.
USPC ........................... 370/330; 370/329; 370/436
(58) Field of Classification Search
USPC ......................................... 370/329, 330, 436
See application file for complete search history.

(56) References Cited

U.S. PATENT DOCUMENTS

| 7,194,288 | B2 * | 3/2007 | Lee et al. ...................... 455/574 |
| 2003/0095517 | A1 | 5/2003 | Proctor |
| 2005/0159163 | A1 * | 7/2005 | Chang et al. .................. 455/450 |
| 2007/0171849 | A1 * | 7/2007 | Zhang et al. .................. 370/310 |
| 2007/0254598 | A1 * | 11/2007 | Bachl et al. ..................... 455/73 |

FOREIGN PATENT DOCUMENTS

| JP | 2005-244991 | 9/2005 |
| JP | 2005-269061 | 9/2005 |
| JP | 2005-318090 | 11/2005 |

OTHER PUBLICATIONS

International Search Report (English & Japanese) for PCT/JP2007/061935 mailed Sep. 18, 2007 (9 pages).
Written Opinion of ISA (Japanese) mailed Sep. 18, 2007 (5 pages).
TSG-RAN WG1 #43, R1-051445, Seoul, Korea, Nov. 7-11, 2005 "E-UTRA Random Access" Ericsson (4 pages).

(Continued)

*Primary Examiner* — Jason Mattis
(74) *Attorney, Agent, or Firm* — Osha Liang LLP

(57) ABSTRACT

A base station determines both a transmission interval between scheduling requests which a mobile station transmits before transmitting uplink data and information about radio resources used for transmitting the scheduling requests, based on the status of the mobile station and/or QoS information transmitted from the mobile station. The mobile station generates the scheduling requests. The mobile station controls the transmission of the scheduling requests based on the transmission interval and the radio resources. The mobile station transmits the scheduling requests. The base station detects correlation based on the scheduling requests which are transmitted from the mobile station based on the transmission interval and the radio resources, and feeds delay information back to the mobile station. The mobile station maintains synchronization based on the delay information transmitted from the base station.

5 Claims, 21 Drawing Sheets

(56) References Cited

OTHER PUBLICATIONS

"Tsushin no Joshiki o Hikkuri Kaesu Musen Broadband no Kakushin—Super 3G(Kohen), Nobori to Kudari de Kotonaru Tsushin Hoshiki o Teian Atarashii Ami Architecture mo Gutaika" "Use Single Carrier FDMA for an Uplink" Onoue et al. Nikkei Communications, No. 452, Nikkei Business Publications, Inc., Dec. 15, 2005.
3GPP TR 25.814 V1.1.1 "Technical Specification Group Radio Access Network; Physical Layer Aspects for Evolved Utra" Feb. 2006 (84 pages).
Japanese Office Action for Application No. 2007-026182, mailed on Dec. 1, 2009 (4 pages).
NTT DoCoMo et al., 3GPP TSG RAN WG1 Meeting #45, "Random Access Channel Structure for E-UTRA Uplink," Shanghai, China, May 8-12, 2006, R1-061184, 13 pages.
Extended European Search Report for Application No. 07745202.7, mailed on Mar. 14, 2011 (8 pages).
LG Electronics: "Uplink Resource Request for Uplink Scheduling", 3GPP Draft; R1-060922 UL Request with TP, 3rd Generation Partnership Project (3GPP), Mobile Competence Centre; 650 Route Des Lucioles; F-06921 Sophia-Antipolis Cedex; France, vol. RAN WG1, No. Athens, Greece; Mar. 21, 2006.
3GPP TR 25.814 V1.5.0 "Technical Specification Group Radio Access Network; Physical Layer Aspects for Evolved Utra" (Release 7) May 27, 2006.
Taiwanese Office Action for Application No. 096121826, mailed on Mar. 23, 2011 (10 pages).
Chinese Office Action for Application No. 2007800300273, mailed on Sep. 28, 2011 (11 pages).
Ericsson, NTT DoCoMo, "Text Proposal for E-UTRA Uplink Timing Control", TSG-RAN WG1 #43, Seoul, Korean, Nov. 7-11, 2005, R1-051446.

* cited by examiner

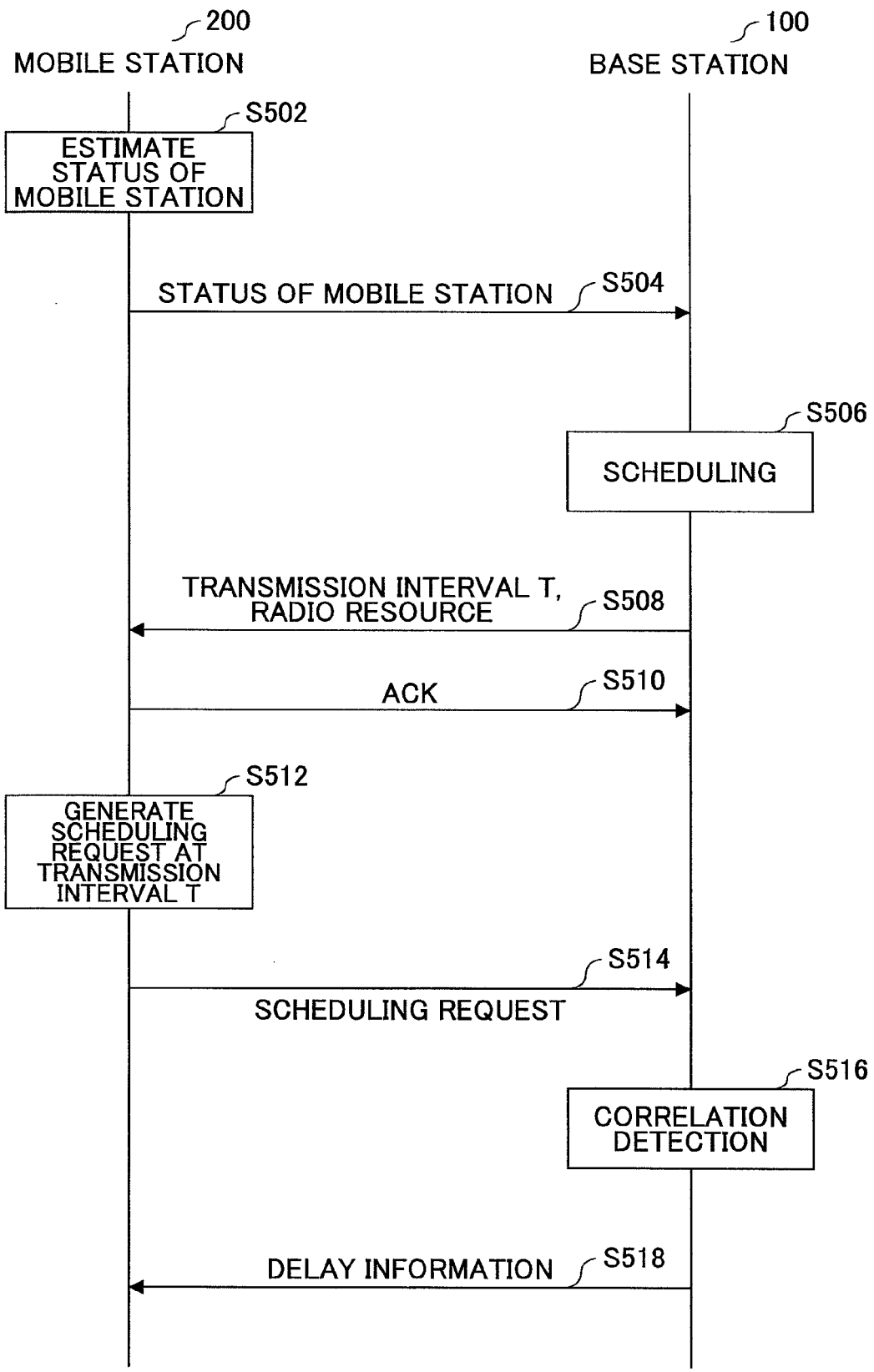

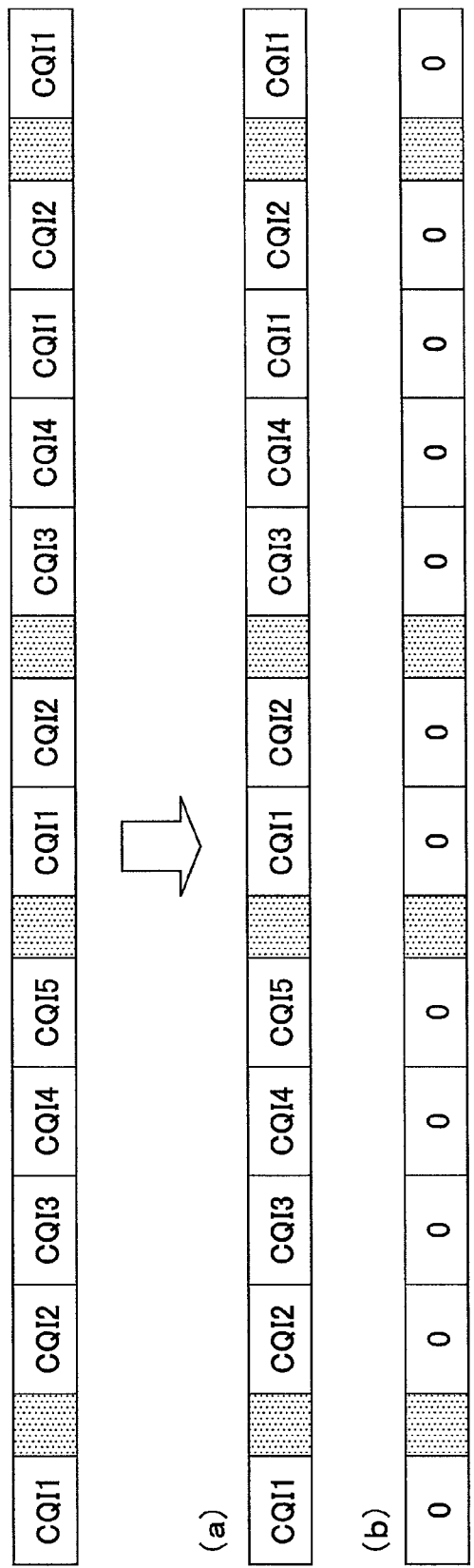

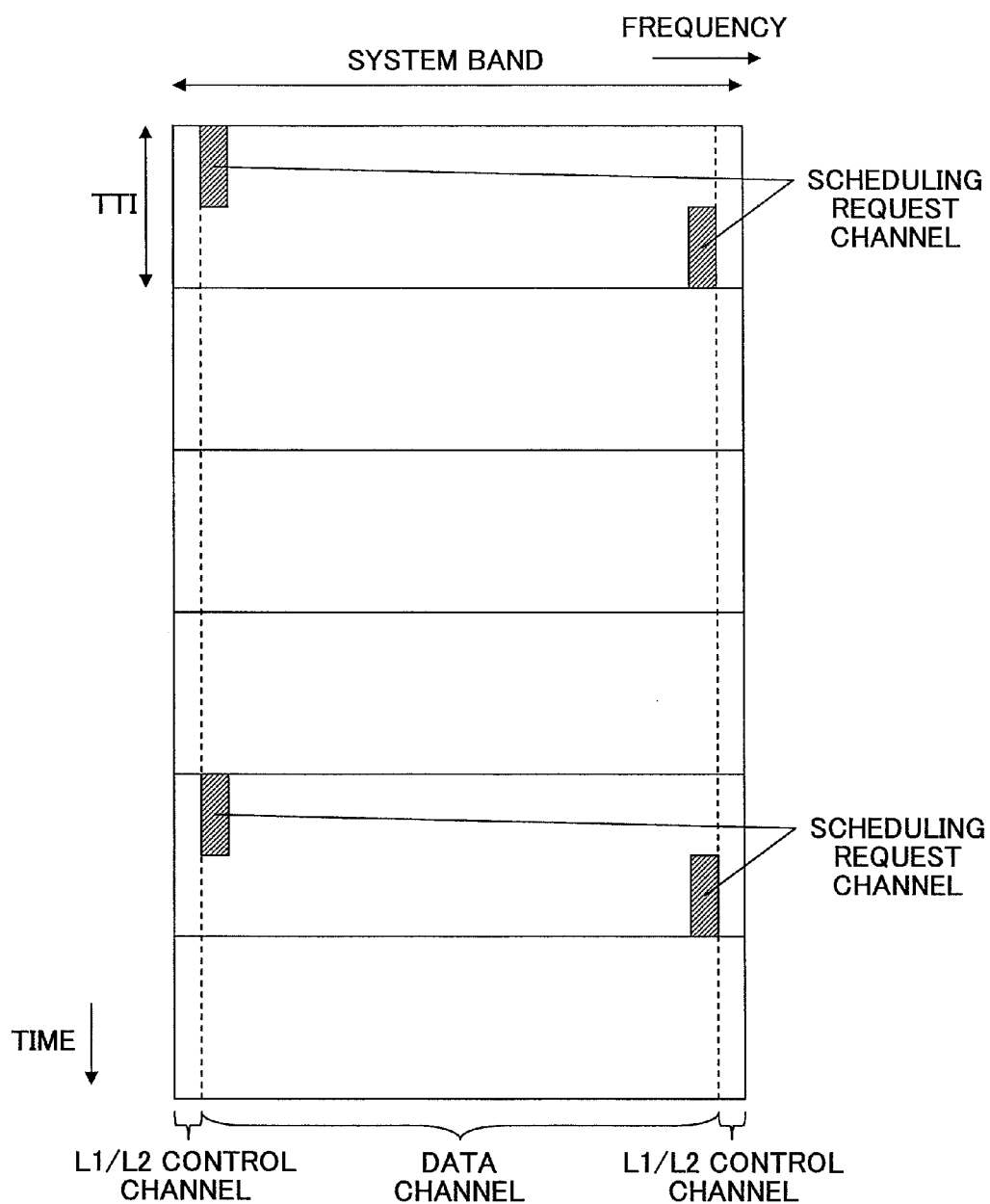

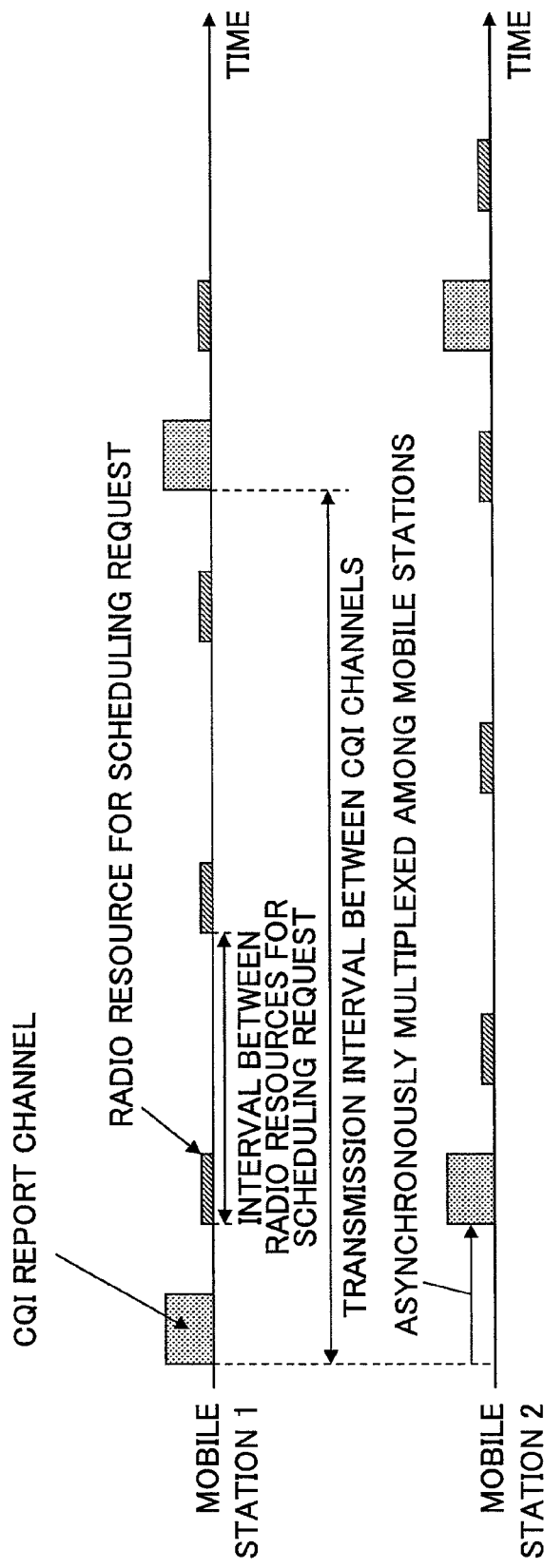

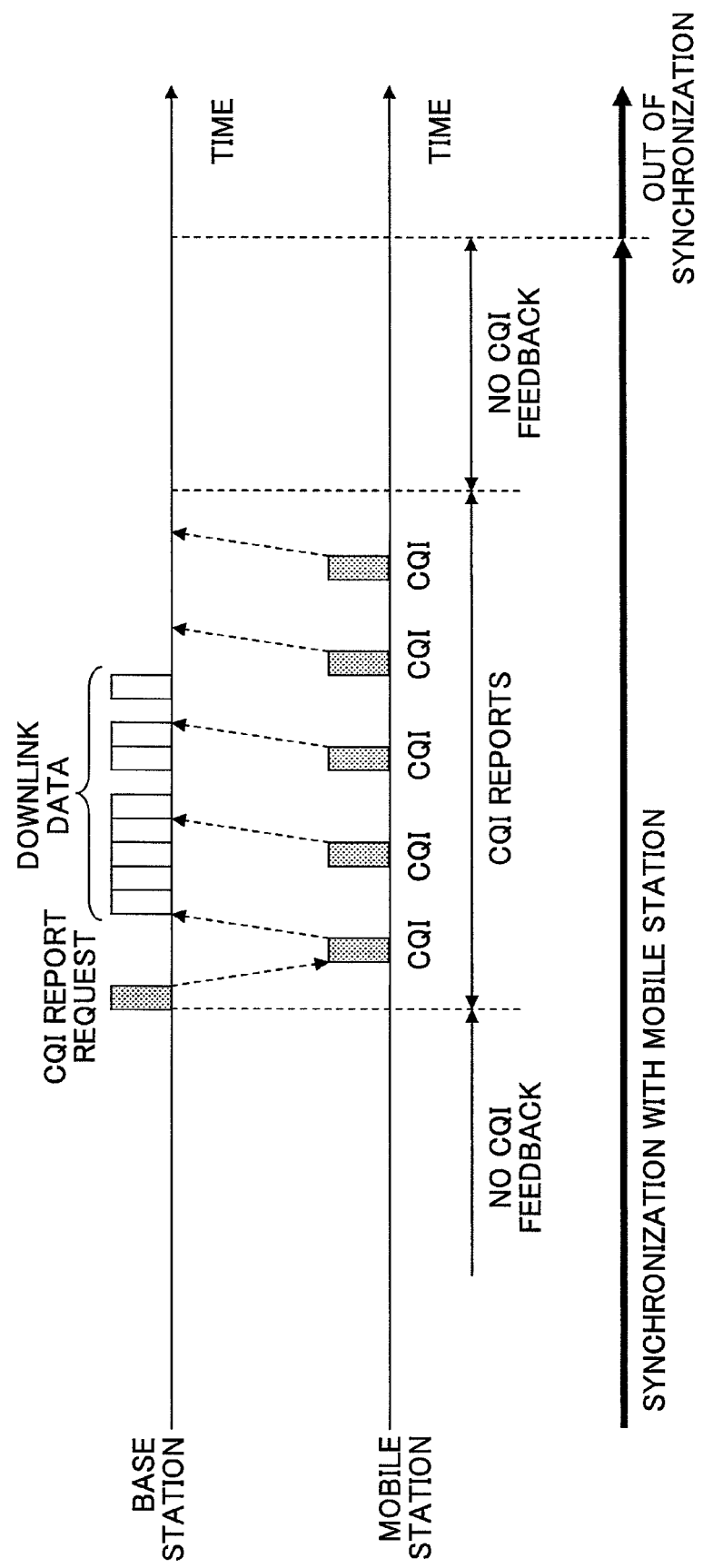

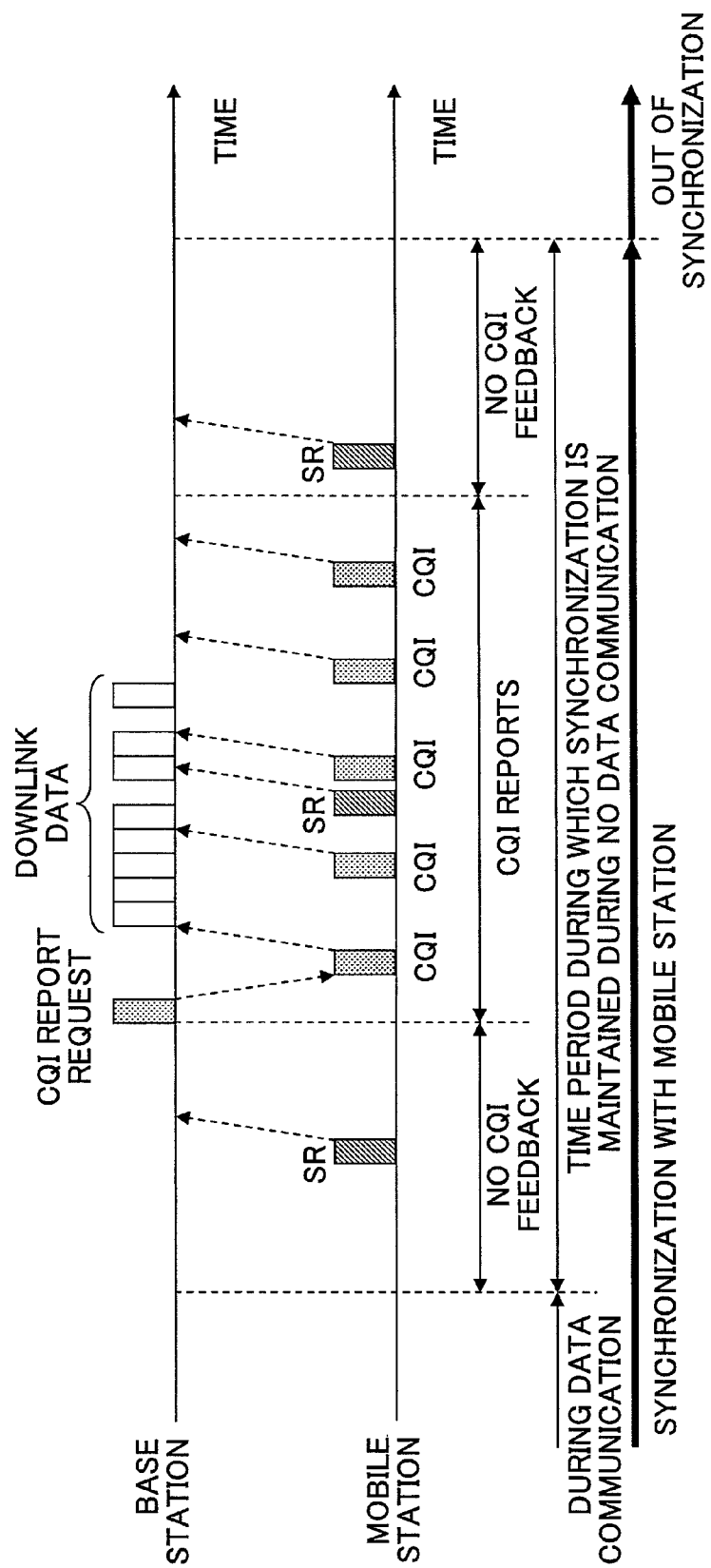

MOBILE STATION, BASE STATION, AND METHOD OF TRANSMITTING AN UPLINK SCHEDULING REQUEST

BACKGROUND OF THE INVENTION

1. Field of the Invention

The present invention relates to a mobile station, a base station, and a method of transmitting an uplink scheduling request in a mobile communication system which uses single-carrier FDMA (Frequency Division Multiple Access) as an uplink radio access scheme.

2. Description of the Related Art

In next generation mobile communication systems, the use of single-carrier FDMA as an uplink radio access scheme is discussed (see 3GPP TR25.814, for example).

In addition, orthogonalizing packets in the frequency domain is required.

SUMMARY OF THE INVENTION

Problem(s) to be Solved by the Invention

However, the related art has the following problems.

In W-CDMA, a base station need not synchronize with respective mobile stations to receive data from the mobile stations. However, in the next generation mobile communication systems, a base station has to synchronize with multiple mobile stations (users) within the same cell (the base station) during uplink packet transmission.

While a mobile station transmits data, the mobile station can include a scheduling request in the data. Based on the data transmitted from the mobile station, the base station can synchronize with the mobile station. While the mobile station does not transmit data, however, the base station cannot synchronize with multiple mobile stations connected to the base station.

The mobile station needs to transmit a scheduling request for uplink data before transmitting the uplink data. In the case of being out of synchronization, the mobile station needs resynchronization upon transmitting the scheduling request, and thus introduces delay.

The present invention addresses at least one of the aforementioned problems. It is a general object of the present invention to provide a mobile station, a base station, and a method of transmitting an uplink scheduling request, in which the uplink scheduling request can be transmitted without uplink transmission data (during periods of no data communication).

Means for Solving the Problem

In one aspect of the present invention, there is provided a mobile station in a mobile communication system which uses single-carrier FDMA as an uplink radio access scheme, comprising:

a receiving unit configured to receive both a transmission interval between scheduling requests which the mobile station transmits before transmitting uplink data and information about radio resources used for transmitting the scheduling requests, while the mobile station maintains synchronization with a base station during a period of no data communication;

a scheduling request generating unit configured to generate the scheduling requests;

a control unit configured to control the transmission of the scheduling requests based on the transmission interval and the radio resources, and to maintain synchronization based on delay information transmitted from the base station; and a transmitting unit configured to transmit the scheduling requests.

This mobile station can transmit the scheduling requests, while the mobile station maintains synchronization with the base station during a period of no data communication.

In another aspect of the present invention, there is provided a base station in a mobile communication system which uses single-carrier FDMA as an uplink radio access scheme, comprising:

a scheduling unit configured to determine both a transmission interval between scheduling requests which a mobile station transmits before transmitting uplink data and information about radio resources used for transmitting the scheduling requests, based on a status of the mobile station and/or QoS information transmitted from the mobile station; and a correlation detecting unit configured to detect correlation based on the scheduling requests which are transmitted from the mobile station based on the transmission interval and the radio resources, and to feed delay information back to the mobile station.

This base station can determine both the transmission interval between the scheduling requests which the mobile station transmits before transmitting uplink data and the radio resources used for transmitting the scheduling requests, based on the status of the mobile station transmitted from the mobile station.

In another aspect of the present invention, there is provided a method of transmitting an uplink scheduling request in a mobile communication system which uses single-carrier FDMA as an uplink radio access scheme, comprising the steps of:

determining, by a base station, both a transmission interval between scheduling requests which a mobile station transmits before transmitting uplink data and information about radio resources used for transmitting the scheduling requests, based on a status of the mobile station and/or QoS information transmitted from the mobile station;

generating, by the mobile station, the scheduling requests;

controlling, by the mobile station, the transmission of the scheduling requests based on the transmission interval and the radio resources;

transmitting, by the mobile station, the scheduling requests;

detecting, by the base station, correlation based on the scheduling requests which are transmitted from the mobile station based on the transmission interval and the radio resources, and feeding delay information back to the mobile station; and maintaining, by the mobile station, synchronization based on the delay information transmitted from the base station.

According to this method, the mobile station can transmit the scheduling requests, while the mobile station maintains synchronization with the base station during a period of no data communication. Furthermore, the base station can determine both the transmission interval between the scheduling requests and the radio resources used for transmitting the scheduling requests, based on the status of the mobile station and/or the QoS information transmitted from the mobile station.

Effect of the Invention

An embodiment of the present invention provides a mobile station, a base station, and a method of transmitting an uplink scheduling request, in which the uplink scheduling request

BRIEF DESCRIPTION OF THE DRAWINGS

FIG. 5 shows a sequence diagram of an operation in a mobile communication system in accordance with one embodiment of the present invention.

FIG. 6C shows third transmission information in the case where scheduling requests are transmitted on a CQI report channel.

FIG. 12A shows allocation of radio resources in the case where scheduling requests are transmitted on a scheduling request channel.

FIG. 12B shows a multiplexing scheme for asynchronously multiplexing channels for respective mobile stations into a scheduling request channel.

FIG. 15A shows a diagram illustrating CQI reports during downlink data transmission.

FIG. 15B shows a diagram illustrating scheduling requests when CQI reports are transmitted during downlink data transmission.

DESCRIPTION OF THE PREFERRED EMBODIMENTS

Figure 1:
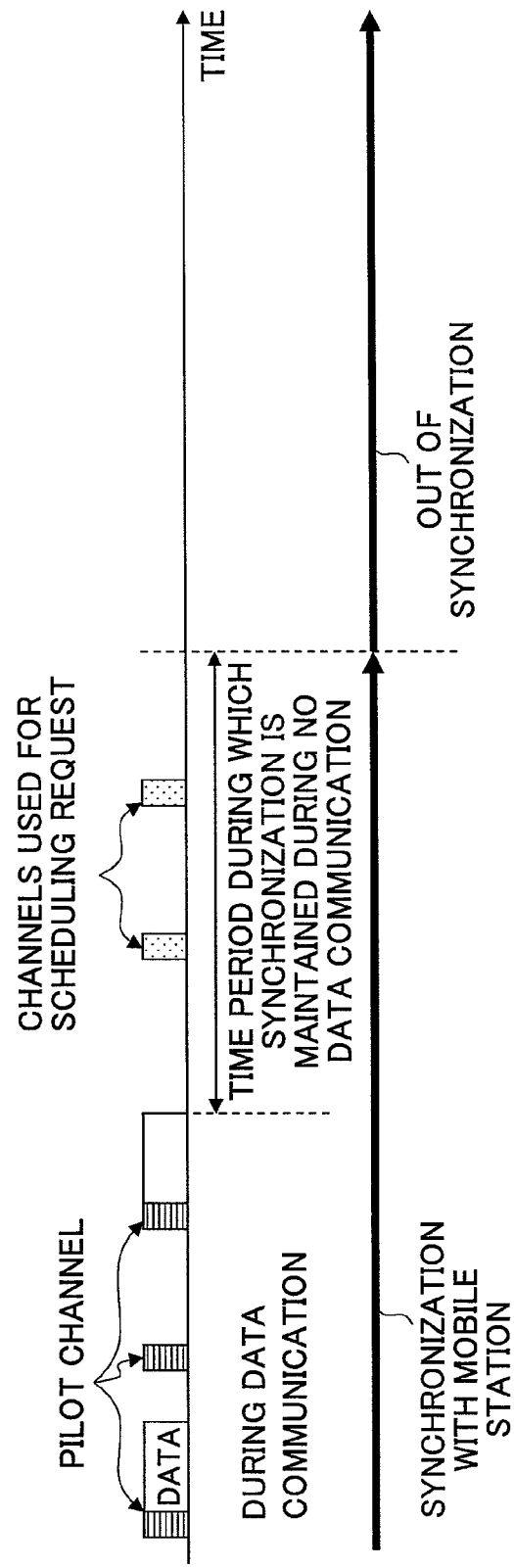
FIG. 1 shows a diagram illustrating uplink scheduling requests.

Description of Notations 100 base station
101 receiving unit
102 scheduler
104 correlation detecting unit
106 transmitting unit
108 CQI demodulating unit
110 CQI measurement correlation detecting unit
112 scheduling request channel correlation detecting unit
20 mobile station
201 receiving unit
202 status estimating unit
204 control unit
206 scheduling request generating unit
208 transmitting unit
210 CQI measuring unit
212 CQI report channel generating unit
214 CQI measurement reference signal generating unit
216 scheduling request channel generating unit

Best Mode of Carrying Out the Invention

A description of embodiments of the present invention is given below, with reference to the accompanying drawings.

Throughout the figures for illustrating the embodiments, corresponding elements are referenced by the same reference numerals, and the repetitive descriptions are omitted.

A mobile communication system in accordance with an embodiment of the present invention is described below.

The mobile communication system includes a base station 100 and a mobile station 200 capable of radio communications with the base station 100.

In the mobile communication system, synchronization is maintained between the base station 100 and multiple mobile stations (users) connected to the base station 100 during periods of no data communication.

Specifically, as shown in FIG. 1, the mobile station 200 transmits a scheduling request before transmitting uplink data, while the mobile station 200 needs to maintain synchronization during periods of no data communication. The base station 100 can synchronize with the mobile station 200 based on the scheduling request transmitted from the mobile station 200 during periods of no data communication. It should be noted that the scheduling request refers to a signal transmitted from the mobile station 200 to the base station 100 in order to maintain synchronization during periods of no data communication. The scheduling request includes at least one bit of information (1=the presence of the scheduling request, 0=the absence of the scheduling request).

The mobile station 200 needs to transmit a scheduling request for uplink data before transmitting the uplink data. In the case of being out of synchronization, the mobile station 200 needs resynchronization upon transmitting the scheduling request, and thus introduces delay. The use of the scheduling request during periods of no data communication can maintain synchronization among the mobile stations 200. Therefore, a mobile station 200 can change from the status of no data communication to the status of data communication without delay.

Structure of a Base Station

Figure 2:
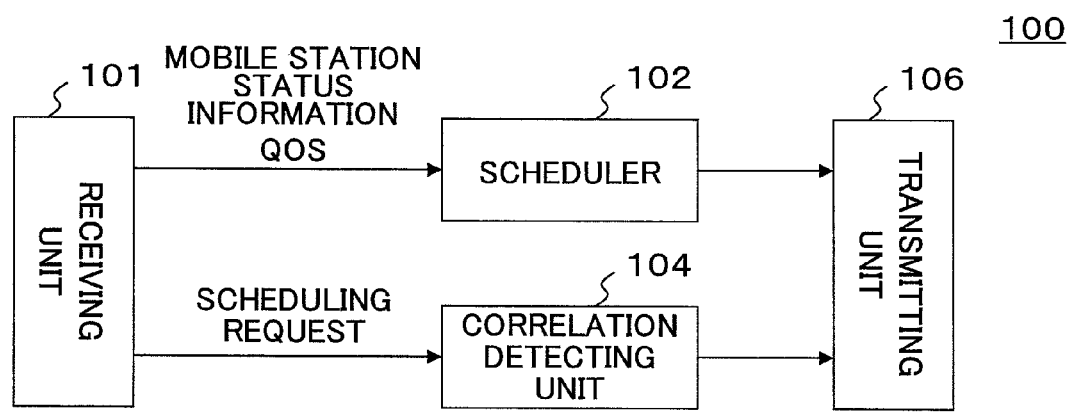
FIG. 2 shows a partial block diagram of a base station in accordance with one embodiment of the present invention.

With reference to FIG. 2, a base station 100 in accordance with an embodiment of the present invention is described below.

The base station 100 includes a receiving unit 101, a scheduler 102, a correlation detecting unit 104, and a transmitting unit 106. The receiving unit 101 receives signals from the mobile station 200. Status information of the mobile station 200 (hereinafter referred to as mobile station status information) and/or QoS information transmitted from the mobile station 200 are supplied to the scheduler 102. Scheduling requests transmitted from the mobile station 200 are supplied to the correlation detecting unit 104.

The receiving unit 101 receives signals from the mobile station 200. As described below, scheduling requests are received on a predetermined channel such as an uplink control channel or a random access channel. Alternatively, scheduling requests may be received on a CQI (Channel Quality Indicator) report channel, a channel used for a reference signal for CQI measurement, or a channel exclusively used for scheduling requests (scheduling request channel).

The scheduler 102 performs scheduling based on the mobile station status information and/or the QoS information transmitted from each mobile station 200. The scheduler 102 determines a transmission interval and a frequency resource used by each mobile station to transmit scheduling requests and supplies them to the transmitting unit 106. In other words, the scheduler 102 provides an opportunity for each mobile station 200 to periodically transmit scheduling requests using the predetermined time/frequency resources at a transmission interval T.

Figure 3:
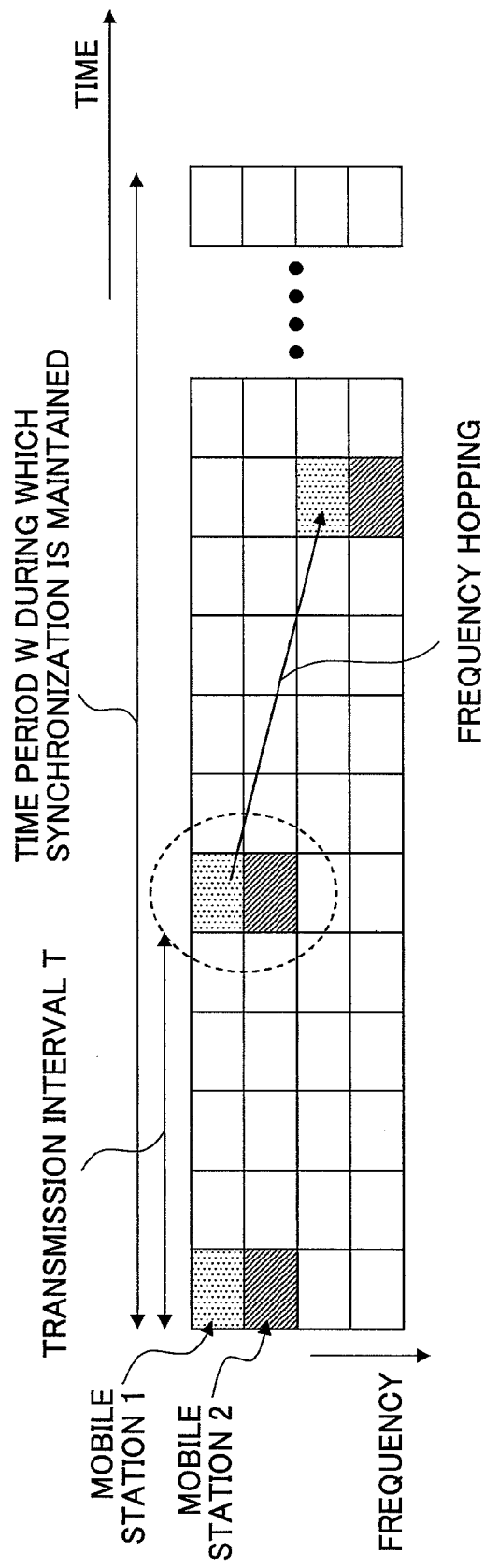
FIG. 3 shows a transmission interval and allocation of radio resources in accordance with one embodiment of the present invention.

As shown in FIG. 3, for example, the scheduler 102 determines both the transmission interval T at which each mobile station 200 is allowed to transmit scheduling requests and the radio resources (for example, at least one of frequency bands which are derived by dividing the assigned system bandwidth, i.e. at least one of frequency blocks) used for transmitting the scheduling requests, for a predetermined time period W during which synchronization is maintained. FIG. 3 shows that the scheduler 102 individually assigns a channel for the scheduling request to each mobile station. Individually assigning a channel to each mobile station can avoid packet collisions among mobile stations. In addition, the need for a user ID for identifying the mobile station can be eliminated and the amount of information associated with scheduling requests can be reduced. It should be noted that the same time period W and the same transmission interval T may be determined in advance in the system or different time periods W or different transmission intervals T may be used depending on cells. If different time periods W and different transmission intervals T are used, they are transmitted on a broadcast channel.

For example, when the mobile station 200 is found to be moving fast based on the mobile station status information (for example, mobility) transmitted from each mobile station 200, the scheduler 102 determines that out of synchronization may easily happen and uses a smaller transmission interval T.

Alternatively, for example, when a frequency error is found to be large based on the mobile station status information (for example, the frequency error between the base station 100 and the mobile station 200), the scheduler 102 determines that out of synchronization may easily happen and uses a smaller transmission interval T.

Alternatively, the scheduler 102 may control, based on a type of communication with the mobile station 200, the time period W during which synchronization is maintained. For example, a longer time period W during which synchronization is maintained during periods of no data communication is needed for a game and the like, for the purpose of key input operations. In this case, the scheduler 102 may use a longer time period W.

The scheduler 102 may allocate different radio resources as a minimum unit of the transmission interval T based on frequency hopping.

The scheduler 102 may perform scheduling so as to multiplex scheduling requests for the respective mobile stations not only by means of FDM (frequency division multiplexing) as described above, but also by means of TDM (time division multiplexing) or CDM (code division multiplexing).

The scheduler 102 may perform scheduling so as to multiplex scheduling requests for the respective mobile stations by means of any combination of FDM, TDM, and CDM.

The transmitting unit 106 transmits both the transmission interval and information about the radio resources to the corresponding mobile station 200 that is the mobile station which has transmitted the scheduling requests.

The correlation detecting unit 104 estimates timing based on correlation detection between the scheduling request transmitted from each mobile station 200 and a replica signal of the received signal sequence. Then, the correlation detecting unit 104 determines delay time $\tau$ and supplies it to the transmitting unit 106.

The transmitting unit 106 transmits the supplied delay time $\tau$ to the corresponding mobile station 200.

Structure of a Mobile Station

Figure 4:
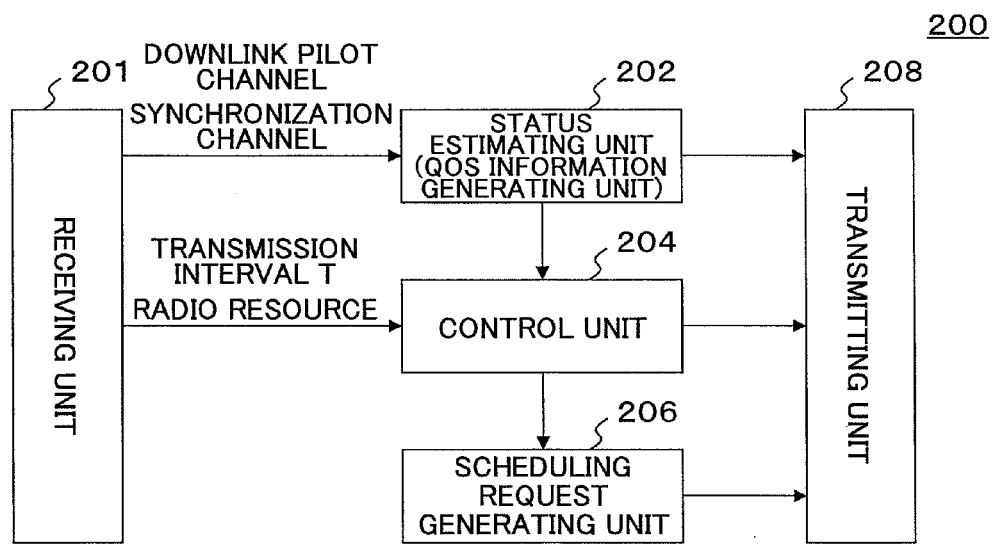
FIG. 4 shows a partial block diagram of a mobile station in accordance with one embodiment of the present invention.

With reference to FIG. 4, a mobile station 200 in accordance with an embodiment of the present invention is described below.

The mobile station 200 includes a receiving unit 201, a status estimating unit 202, a control unit 204, a scheduling request generating unit 206, and a transmitting unit 208. The receiving unit 201 receives signals from the base station 100. A downlink pilot signal on a downlink pilot channel and/or a synchronization signal on a synchronization channel are supplied to the status estimating unit 202. The transmission interval T and information about the radio resources are supplied to the control unit 204.

The downlink pilot signal on the downlink pilot channel and/or the synchronization signal on the synchronization channel are supplied to the status estimating unit 202.

The status estimating unit 202 estimates the status of the mobile station 202 (for example, mobility, a frequency error between the base station and the mobile station (i.e. a frequency error in the synthesizer)). The status estimating unit 202 supplies information about the estimated status of the mobile station 200 to the transmitting unit 208. The transmitting unit 208 transmits the supplied information about the status of the mobile station 200 to the base station 100. Alternatively, the status estimating unit 202 may generate QoS required for communication with the base station 100 and transmit it to the base station 100.

When the mobile station 200 transmits scheduling requests on a contention-free channel as described below, the estimating unit 202 need not transmit the status of the mobile station 200 and/or the QoS to the base station 100. In this case, the mobile station 200 transmits the scheduling requests on its own determination. The mobile station 200 may puncture (thin out) the transmission interval T to transmit the scheduling requests.

Both the radio resources used for transmitting the scheduling requests and information about the transmission interval T, which are transmitted from the base station 100, are supplied to the control unit 204.

The control unit 204 instructs the scheduling request generating unit 206 to generate scheduling requests, when both the radio resources used for transmitting the scheduling requests and the information about the transmission interval T are supplied to the control unit 204.

The scheduling request generating unit 206 generates scheduling requests according to the instruction by the control unit 204. For example, the scheduling request generating unit 204 generates a contention-based channel (for example, synchronous/asynchronous random access channel) which includes control information such as a user ID. The use of the contention-based channel can save radio resources. Alternatively, the scheduling request generating unit 206 may generate a contention-free channel (for example, a pilot channel, an L1/L2 control channel (uplink control channel)) which includes control information such as a user ID and the radio resources are allocated in advance. The use of the contention-free channel can improve reliability. Alternatively, the scheduling request generating unit 206 may generate a CQI report channel, a channel used for a reference signal for CQI measurement, or a channel exclusively used for scheduling requests.

Alternatively, the scheduling request generating unit 206 may generate the contention-based channel which includes control information such as a user ID or the contention-free channel which includes control information such as a user ID, according to predetermined periodicity with a minimum unit of the transmission interval T. In other words, the scheduling request generating unit 206 may generate the combination of the contention-based channel and the contention-free channel.

Alternatively, the scheduling request generating unit 206 may generate a contention-based channel which includes control information such as a user ID or a contention-free channel which includes control information such as a user ID, according to the QoS. For example, the scheduling request generating unit 206 generates a contention-free channel for mobile stations with higher QoS.

Operation in a Mobile Communication System

With reference to FIG. 5, an operation in a mobile communication system in accordance with an embodiment of the present invention is described below.

The status estimating unit 202 in the mobile station 200 estimates the status of the mobile station 200 and/or the QoS (step S502) and transmits them to the base station 100 (step S504).

The base station 100 performs scheduling based on the status of the mobile station 200 and/or the QoS transmitted from the mobile station 200 (step S506) and transmits both the transmission interval T between scheduling requests and information about the radio resources used for transmitting the scheduling requests (step S508).

The mobile station 200 returns an ACK (acknowledgement) in response to both the transmission interval T between scheduling requests and the information about the radio resources used for transmitting the scheduling requests (step S510).

The scheduling request generating unit 206 in the mobile station 200 generates scheduling requests at the transmission interval T (step S512). The transmitting unit 208 transmits the scheduling requests generated by the scheduling request generating unit 206 at the time interval T with the specified radio resources under the control of the control unit 204 (step S514).

The correlation detecting unit 204 in the base station 100 performs correlation detection between the received signal sequence and the replica signal, estimates timing, and determines delay time τ. The correlation detecting unit 204 feeds the delay time τ back to the mobile station 200 (step S518). Alternatively, the correlation detecting unit 204 may determine the delay time τ, then derive a difference from the previously determined delay time, and transmit the difference as delay information to the mobile station 200. Transmitting the difference can reduce the amount of information to be transmitted.

Example of Transmitting Scheduling Requests on a CQI Report Channel

With reference to FIGS. 6A-8, examples of transmitting scheduling requests from the mobile station on a CQI report channel are described below.

In a typical mobile communication system, the mobile station 200 periodically reports CQIs to the base station 100 while synchronization is maintained with mobile stations. The mobile station 200 can modify the CQI to transmit the scheduling request. For example, the mobile station 200 inserts the scheduling request into one of N CQIs which are transmitted to the base station 100 and transmits the scheduling request, where N is any integer value. Transmission information in the case where the mobile station 200 inserts the scheduling request into the CQI and transmits the scheduling request is described in detail below. N may be determined in advance in the mobile communication system or may be adaptively determined based on the communication environment.

It is assumed that the CQI has five bits of information; 32 ($=2^5$) quality levels can be expressed by the five bits. Typically, a CQI with a larger effect on the quality level has more redundant bits. For example, CQI1 is transmitted four times, CQI2 is transmitted three times, CQI3 and CQI4 are transmitted twice, and CQI5 is transmitted once within a single symbol.

Figure 6A:
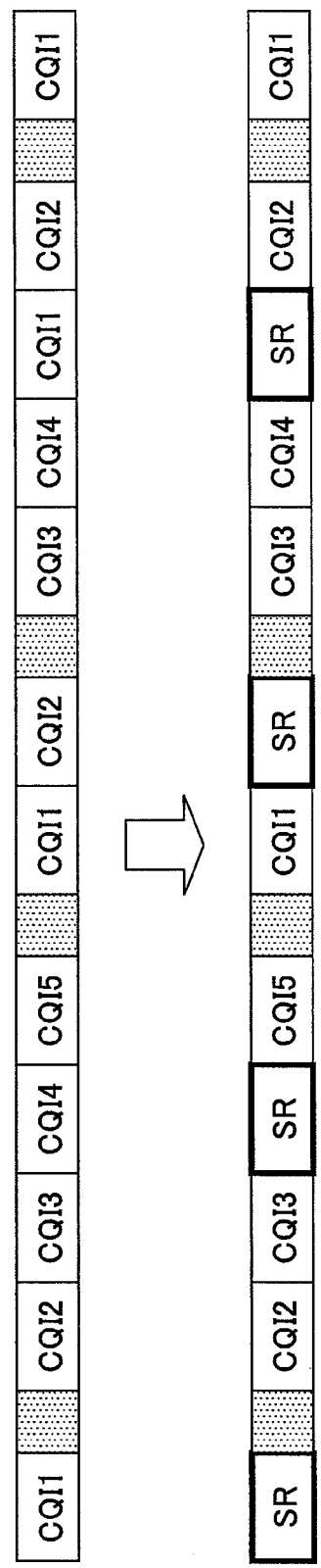
FIG. 6A shows first transmission information in the case where scheduling requests are transmitted on a CQI report channel.

As shown in FIG. 6A, when the mobile station 200 transmits the scheduling request to the base station 100, part of CQI1-CQI5 can be replaced with the scheduling request (SR). The scheduling request includes one bit at the minimum indicating the presence or absence of the scheduling request. FIG. 6A shows an example of transmitting the scheduling request (SR) with four bits. The base station 100 can demodulate signals on the CQI report channel and determine the presence or absence of the scheduling request by referring to the predetermined bits (four bits in FIG. 6A).

Figure 6B:
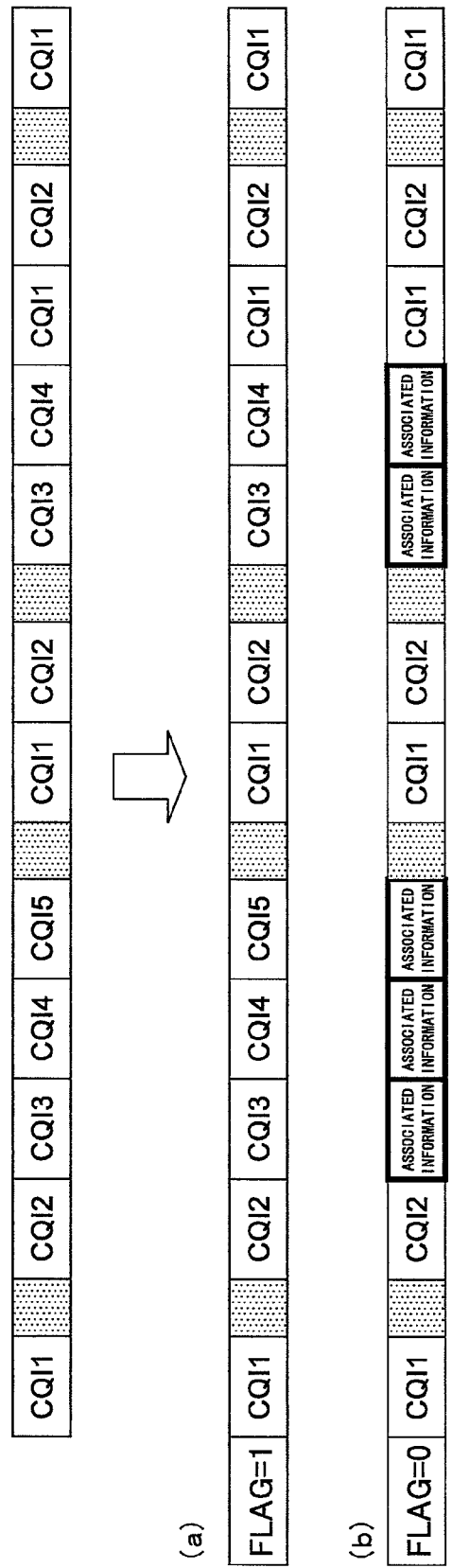
FIG. 6B shows second transmission information in the case where scheduling requests are transmitted on a CQI report channel.

Alternatively, as shown in FIG. 6B, the presence or absence of the scheduling request may be determined by a flag with one bit located at the beginning of the CQI report channel. If the flag is equal to one (FIG. 6B(a)), the base station 100 determines that the CQI is represented with all of the five bits. If the flag is equal to zero (FIG. 6B(b)), the base station 100 determines that the mobile station 200 has transmitted the scheduling request. If the flag is equal to zero, part (CQI3-CQI5) of CQI1-CQI5 may be used for associated information of the scheduling request. For example, the associated information may be the amount of data to be transmitted from the mobile station 200.

Alternatively, as shown in FIG. 6C, when the base station 100 receives the CQI in which all of CQI1-CQI5 are equal to zero (FIG. 6C(b)), the base station 100 may determine that the mobile station 100 has transmitted the scheduling request. Alternatively, when the base station 100 receives the CQI in which CQI3-CQI5 are equal to zero, the base station 100 may determine that the mobile station 100 has transmitted the scheduling request.

It should be noted that orthogonal sequences can be preferentially used for scheduling requests, when multiple mobile stations transmit scheduling requests within the same cell.

Transmitting scheduling requests on the CQI report channel can almost eliminate the need for allocating radio resources solely for the scheduling requests. In addition, the same coverage (the area within which signals can arrive) as that of the CQI report channel can be supported.

Figure 7:
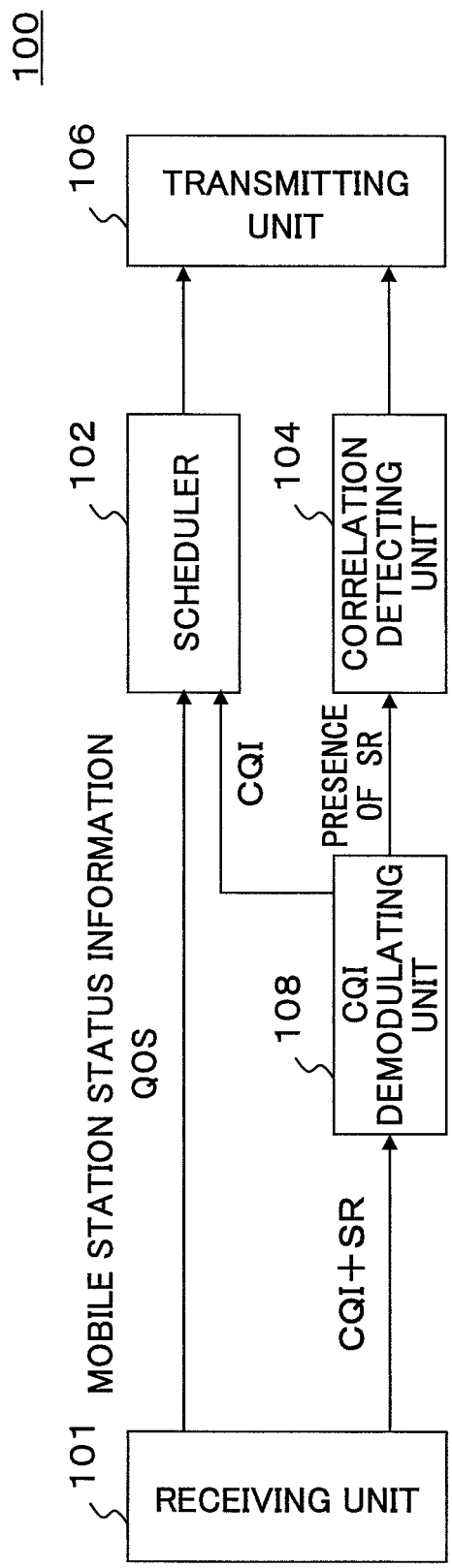
FIG. 7 shows a partial block diagram of a base station in the case where scheduling requests are transmitted on a CQI report channel.

FIG. 7 shows a partial block diagram of a base station 100 in the case where scheduling requests are transmitted on the CQI report channel. The base station 100 shown in FIG. 7 further includes a CQI demodulating unit 108 in addition to the components in the base station 100 shown in FIG. 2.

The CQI demodulating unit 108 demodulates signals on the CQI report channel received by the receiving unit 101, and then extracts the presence or absence of the scheduling request (SR) and the CQI. In the case of the presence of the scheduling request, the correlation detecting unit 104 determines delay time. The CQI demodulating unit 108 demodulates signals on the CQI report channel and supplies the CQI to the scheduler 102. The scheduler 102 allocates a radio resource to each mobile station based on the CQI.

Figure 8:
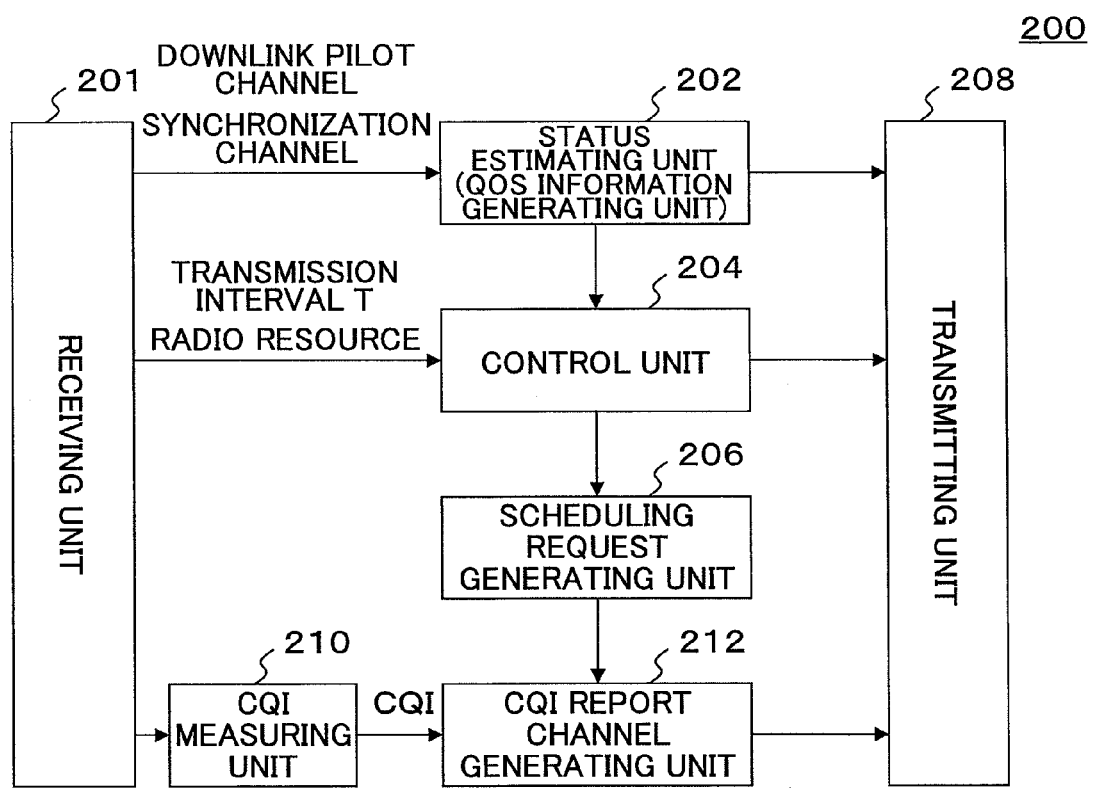
FIG. 8 shows a partial block diagram of a mobile station in the case where scheduling requests are transmitted on a CQI report channel.

FIG. 8 shows a partial block diagram of a mobile station 200 in the case where scheduling requests are transmitted on the CQI report channel. The mobile station 200 shown in FIG. 8 further includes a CQI measuring unit 210 and a CQI report channel generating unit 212 in addition to the components in the mobile station 200 shown in FIG. 4.

The receiving unit 201 receives signals on the pilot channel or the like. The CQI measuring unit 210 measures a CQI based on SIR (Signal to Interference Ratio) or the like. The CQI is supplied to the CQI report channel generating unit 212.

In the case of the presence of the scheduling request, the CQI report channel generating unit 212 combines a scheduling request and the CQI, and generates the CQI report channel. In the case of the absence of the scheduling request, the CQI report channel generating unit 212 generates the CQI report channel using the normal CQI format.

Example of Transmitting a Scheduling Request as a Reference Signal for CQI Measurement With reference to FIGS. 9-11, an example of transmitting a scheduling request from the mobile station as a reference signal for CQI measurement is described below.

Typically, the reference signal for CQI measurement is transmitted with one symbol located at the beginning of the TTI. When sequences A-D can be used as the reference signal for CQI measurement, it is determined in advance that the sequence A is used when a mobile station 200*a* does not transmit the scheduling request, the sequence B is used when the mobile station 200*a* transmits the scheduling request, the sequence C is used when a mobile station 200*b* does not transmit the scheduling request, the sequence D is used when the mobile station 200*b* transmits the scheduling request.

Figure 9:
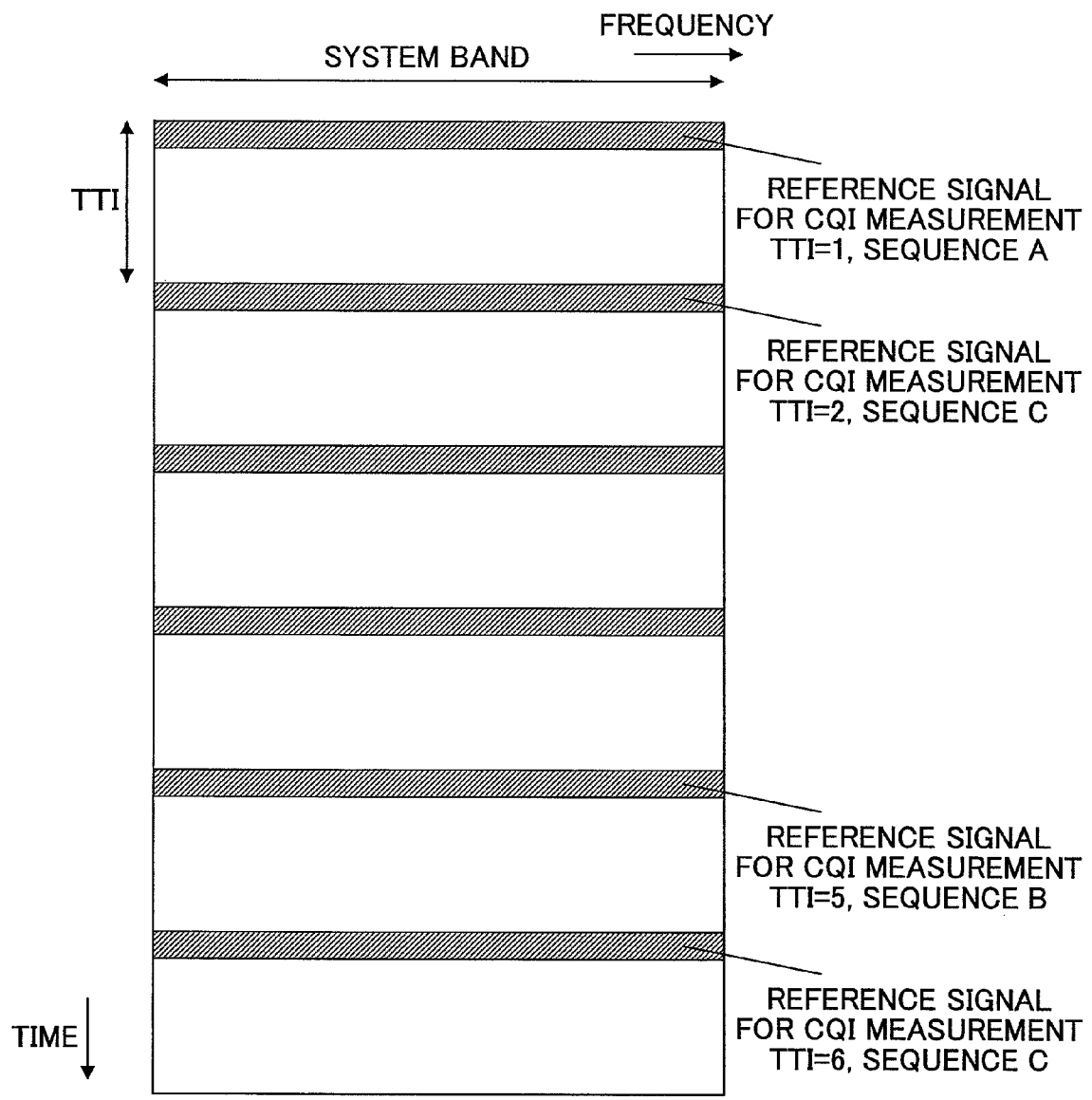
FIG. 9 shows allocation of radio resources in the case where a scheduling request is transmitted as a reference signal for CQI measurement.

Using the sequences determined in advance, the base station 100 can find that the mobile station 200*a* has not transmitted the scheduling request upon receiving the sequence A of the reference signal for CQI measurement at TTI=1, as shown in FIG. 9. Similarly, the base station 100 can find that the mobile station 200*a* has transmitted the scheduling request upon receiving the sequence B of the reference signal for CQI measurement at TTI=5.

It should be noted that orthogonal sequences are used for the reference signals for CQI measurement when multiple mobile stations transmit scheduling requests within the same cell.

Transmitting the scheduling request as the reference signal for CQI measurement can almost eliminate the need for allocating radio resources solely for the scheduling request. On the other hand, this may reduce the coverage within which scheduling requests can arrive, because only one symbol located at the beginning of the TTI is used. In addition, the number of mobile stations whose signals can be orthogonally multiplexed becomes smaller, because two sequences of the reference signal for CQI measurement are needed for each mobile station.

Figure 10:
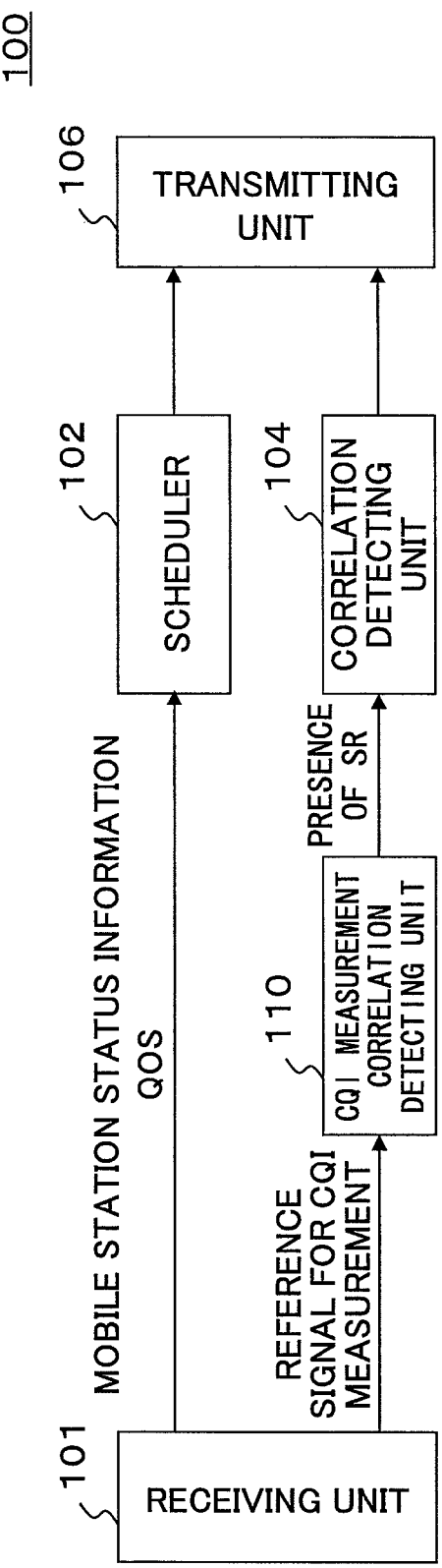
FIG. 10 shows a partial block diagram of a base station in the case where a scheduling request is transmitted as a reference signal for CQI measurement.

FIG. 10 shows a partial block diagram of a base station 100 in the case where a scheduling request is transmitted as the reference signal for CQI measurement. The base station 100 shown in FIG. 10 further includes a CQI measurement correlation detecting unit 110 in addition to the components in the base station 100 shown in FIG. 2.

The CQI measurement correlation detecting unit 110 performs correlation detection of the reference signal for CQI measurement received by the receiving unit 101, and then extracts the presence or absence of the scheduling request (SR). For example, when the CQI measurement correlation detecting unit 110 detects correlation with the sequence A, the CQI measurement correlation detecting unit 110 determines that the mobile station 200*a* has not transmitted the scheduling request. When the CQI measurement correlation detecting unit 110 detects correlation with the sequence B, the CQI measurement correlation detecting unit 110 determines that the mobile station 200*a* has transmitted the scheduling request. In the case of the presence of the scheduling request, the correlation detecting unit 104 determines delay time.

Figure 11:
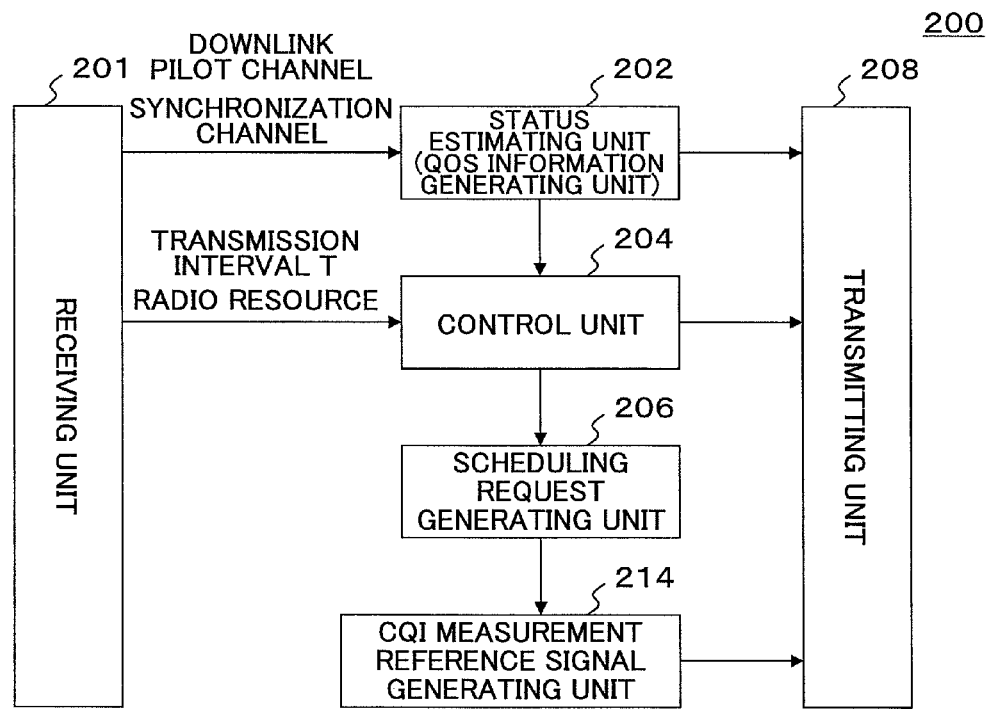
FIG. 11 shows a partial block diagram of a mobile station in the case where a scheduling request is transmitted as a reference signal for CQI measurement.

FIG. 11 shows a partial block diagram of a mobile station 200 in the case where the scheduling request is transmitted as the reference signal for CQI measurement. The mobile station 200 shown in FIG. 11 further includes a CQI measurement reference signal generating unit 214 in addition to the components in the mobile station 200 shown in FIG. 4.

The CQI measurement reference signal generating unit 214 generates the reference signal for CQI measurement according to the presence or absence of the scheduling request. In the example of the aforementioned mobile station 200*a*, the CQI measurement reference signal generating unit 214 generates the sequence A in the case of the presence of the scheduling request and generates the sequence B in the case of the absence of the scheduling request.

Example of Transmitting Scheduling Requests on a Scheduling Request Channel

With reference to FIGS. 12A-14, an example of transmitting scheduling requests from the mobile station on a scheduling request channel is described below.

The scheduling request channel is a channel such as a random access channel, which is used for transmitting scheduling requests with exclusive time and frequency resources.

FIG. 12A shows an example of radio resource allocation of the scheduling request channel. In FIG. 12A, part of a data channel is assigned to the scheduling request channel. Alternatively, part of an L1/L2 control channel may be assigned to the scheduling request channel. When sequences A-D can be used for scheduling requests, it is determined in advance that the sequence A is used when the mobile station 200*a* transmits scheduling requests, the sequence B is used when the mobile station 200*b* transmits scheduling requests, and so on.

Using the sequences determined in advance, the base station 100 can perform correlation detection with the sequences A-D to find which mobile stations transmit scheduling requests.

It should be noted that orthogonal sequences can be preferentially used for scheduling requests, when multiple mobile stations transmit scheduling requests within the same cell.

Transmitting scheduling requests on the scheduling request channel may increase overhead, since radio resources for the scheduling request channel need to be allocated. On the other hand, it is possible to use two TTIs for the scheduling request channel in the case of a long cell radius, and to use one TTI for the scheduling request channel in the case of a short cell radius, as is the case with a random access channel.

Figure 12C:
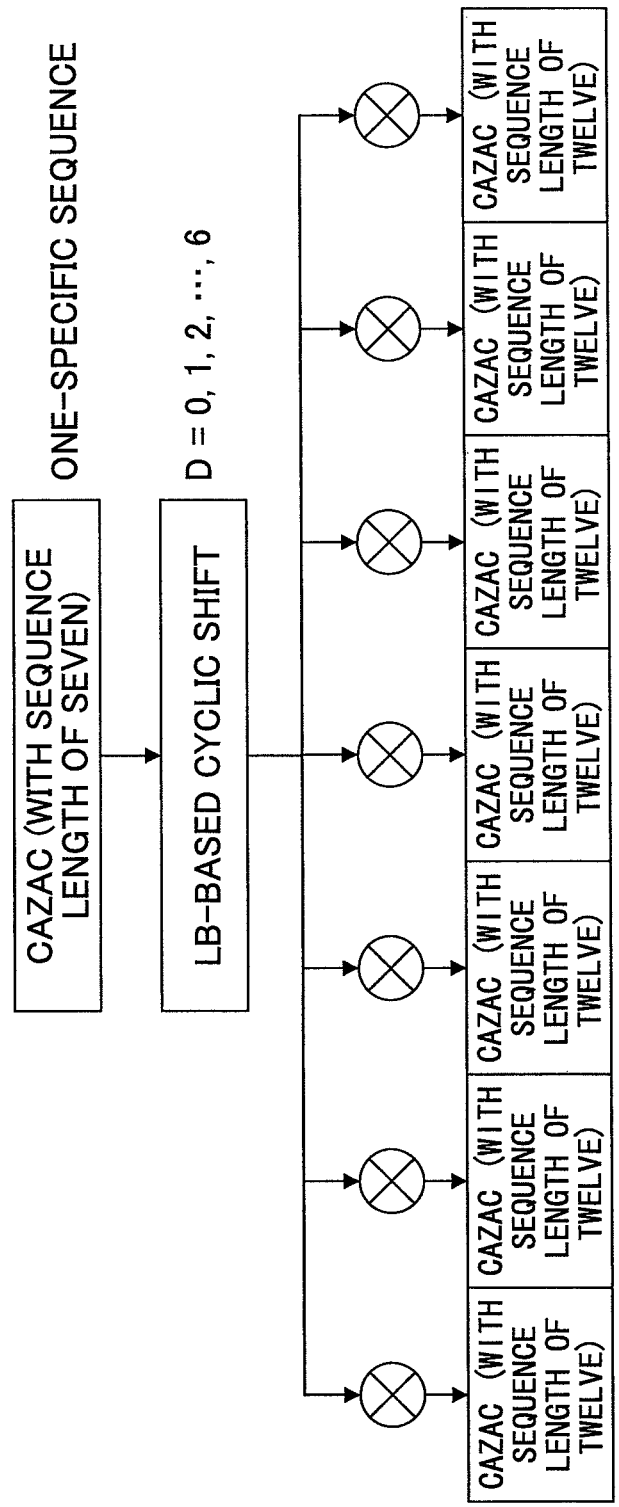
FIG. 12C shows a multiplexing scheme for synchronously multiplexing channels for respective mobile stations into a scheduling request channel.

With reference to FIGS. 12B and 12C, an example of multiplexing channels for multiple mobile stations into the scheduling request channel. FIG. 12B shows a multiplexing scheme for asynchronously multiplexing channels for multiple mobile stations. FIG. 12C shows a multiplexing scheme for synchronously multiplexing channels for multiple mobile stations.

In the case of asynchronous multiplexing, radio resources for scheduling requests are assigned to TTIs which are different from TTIs for the CQI report channel. In addition, the radio resources are asynchronously allocated among the respective mobile stations so as to maintain orthogonality among the mobile stations.

In the case of synchronous multiplexing, scheduling requests are code-multiplexed among mobile stations. In other words, scheduling requests have to be code-multiplexed because the scheduling requests are transmitted from the mobile stations at the same TTI. Specifically, synchronously allocated radio resources for the scheduling requests are code-multiplexed using orthogonal code-multiplexing. The orthogonal code-multiplexing uses block-based shifting of a CAZAC (Constant Amplitude Zero Auto-Correlation) sequence. For example, when scheduling requests for seven mobile stations are multiplexed, a CAZAC sequence with the sequence length of seven is provided. The CAZAC sequence with the sequence length of seven is processed by a long-block-based cyclic shift, and then multiplied with another CAZAC sequence (with the length of twelve, for example) which is assigned to each mobile station. In this manner, orthogonality can be maintained among the mobile stations.

Similarly, the CQI report channel and the scheduling channel can be multiplexed using the multiplexing scheme shown in FIG. 12C twice.

Figure 13:
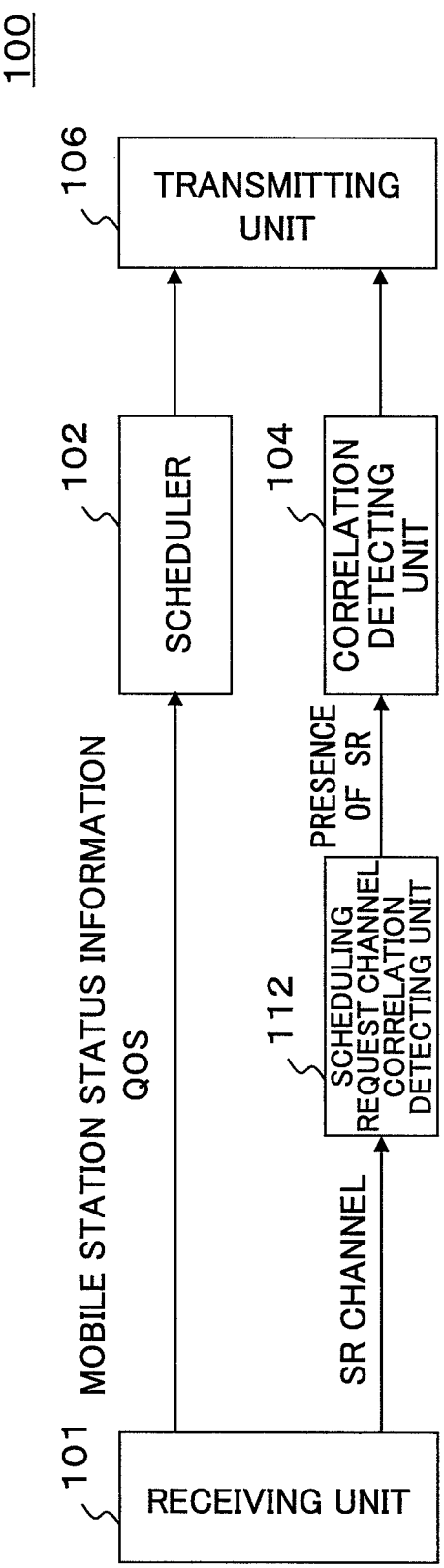
FIG. 13 shows a partial block diagram of a base station in the case where scheduling requests are transmitted on a scheduling request channel.

FIG. 13 shows a partial block diagram of a base station 100 in the case where scheduling requests are transmitted on the scheduling request channel. The base station 100 shown in FIG. 13 further includes a scheduling request channel correlation detecting unit 112 in addition to the components in the base station 100 shown in FIG. 2.

The scheduling request channel correlation detecting unit 112 performs correlation detection of signals received by the receiving unit 101, and then extracts the presence or absence of the scheduling request (SR). For example, when the scheduling request channel correlation detecting unit 112 detects correlation with the sequence A, the scheduling request channel correlation detecting unit 112 determines that the mobile station 200a has transmitted the scheduling request. When the scheduling request channel correlation detecting unit 112 detects correlation with the sequence B, the scheduling request channel correlation detecting unit 112 determines that the mobile station 200b has transmitted the scheduling request. In the case of the presence of the scheduling request, the correlation detecting unit 104 determines delay time.

Figure 14:
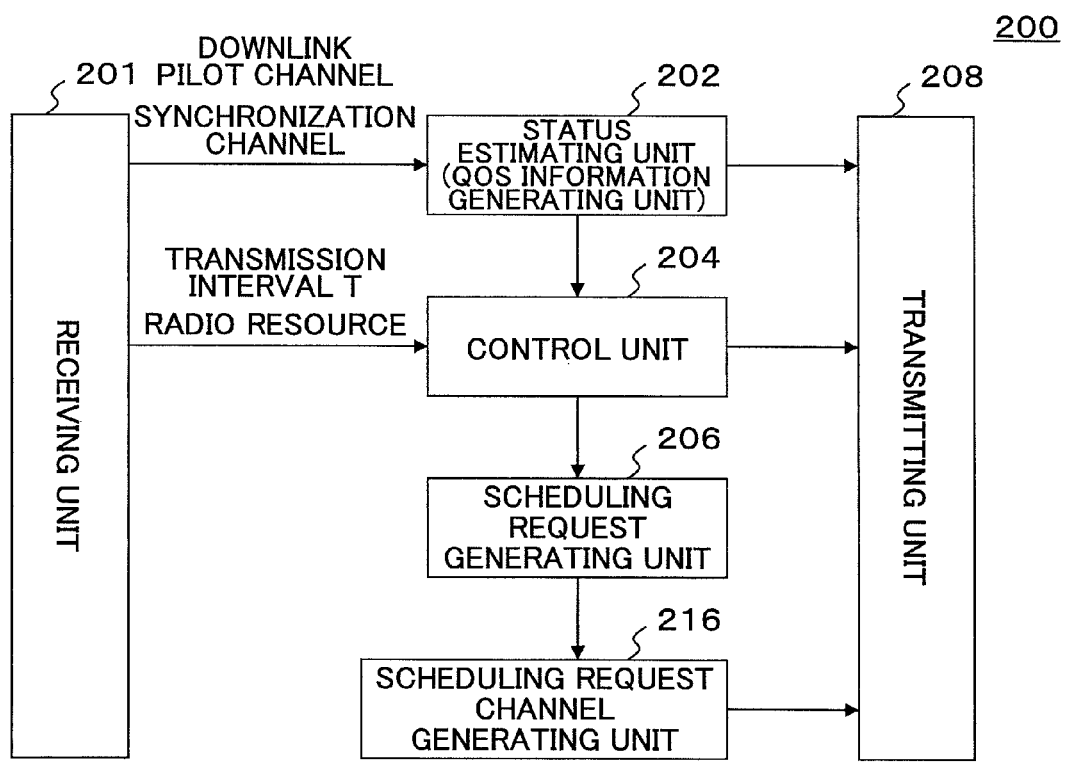
FIG. 14 shows a partial block diagram of a mobile station in the case where scheduling requests are transmitted on a scheduling request channel.

FIG. 14 shows a partial block diagram of a mobile station 200 in the case where scheduling requests are transmitted on the scheduling request channel. The mobile station 200 shown in FIG. 14 further includes a scheduling request channel generating unit 216 in addition to the components in the mobile station 200 shown in FIG. 4.

The scheduling request channel generating unit 216 generates a predetermined sequence in the case of the presence of the scheduling request. For example, the scheduling request channel generating unit 216 generates the sequence A in the case of the presence of the scheduling request and does not generate the sequence in the case of the absence of the scheduling request.

Example of Reporting CQIs During Downlink Data Transmission

It is assumed that the mobile station 200 periodically reports CQIs to the base station 100 in FIGS. 6A-8. Under this assumption, the mobile station inserts the scheduling request into the CQI. As shown in FIG. 15A, however, the mobile station 200 may report CQIs in response to a request from the base station 100. Specifically, the base station 100 transmits a CQI report request to the mobile station 200 before downlink data transmission, in order to eliminate CQI reports during periods of no data communication. The mobile station 200 reports CQIs after receiving the CQI report request. In the case of no downlink data, the base station 100 may transmit a CQI report stop request, and then the mobile station 200 may stop reporting CQIs. In this case, the mobile station 200 cannot insert the scheduling request into the CQI for a time period of no CQI report (no CQI feedback). Accordingly, the scheduling request needs to be transmitted on channels other than the CQI report channel.

In order to address this case, the mobile station 200 transmits scheduling requests on a channel dedicated to that mobile station itself, as shown in FIG. 3. Using the dedicated channel, the mobile station 200 can transmit the scheduling request (SR) during a period of no CQI feedback to maintain synchronization, as shown in FIG. 15B. As described above, individually assigning a channel for the scheduling request to each mobile station can avoid packet collisions among mobile stations. In addition, the need for a user ID for identifying the mobile station can be eliminated and the amount of information associated with scheduling requests can be reduced.

Figure 16:
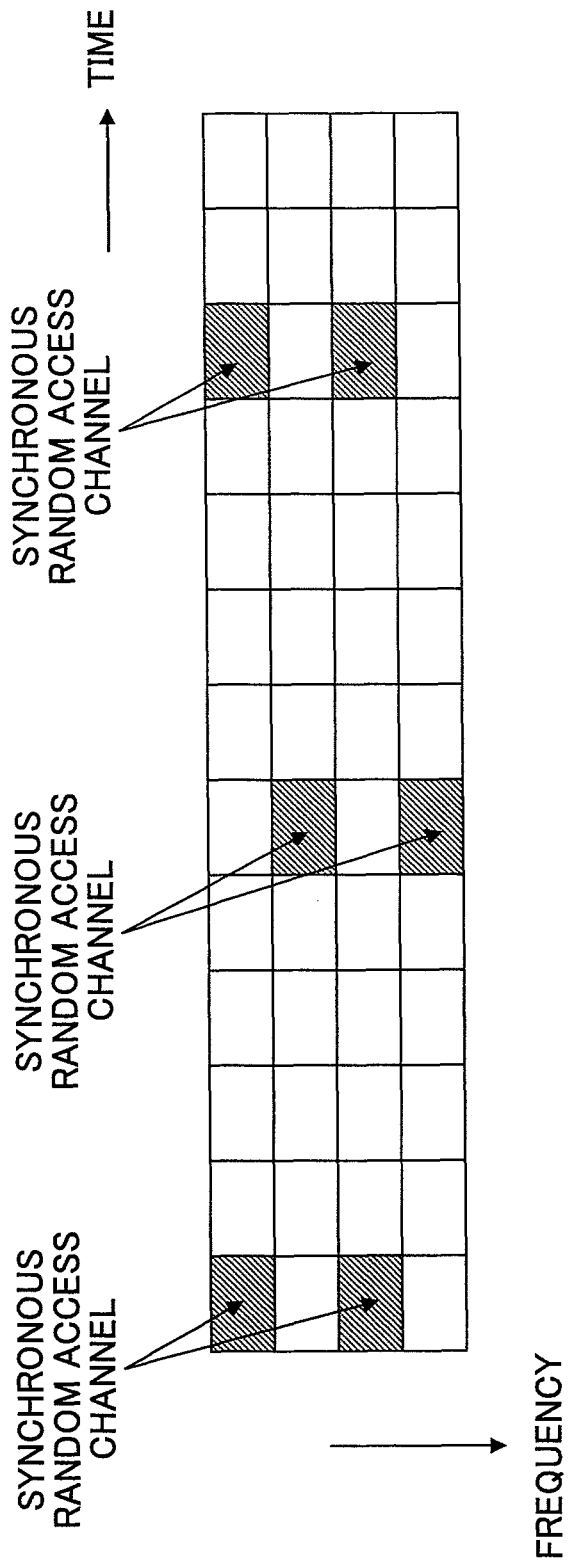
FIG. 16 shows allocation of radio resources in the case where scheduling requests are transmitted on a synchronous random access channel.

Alternatively, the mobile station may transmit scheduling requests on a random access channel which is shared by multiple mobile stations. This random access channel is referred to as a synchronous random access channel, because synchronization is maintained. As shown in FIG. 16, radio resources for the synchronous random access channel are determined in advance in the mobile communication system. The mobile station 200 randomly selects one of the predetermined radio resources for the synchronous random access channel to transmit the scheduling request. The mobile station 200 includes a user ID for identifying the mobile station 200 in the scheduling request. Determining the synchronous random access channel in this manner can eliminate the need for always reserving radio resources for all the mobile stations, as opposed to the scheme for assigning a dedicated channel to each user (FIG. 3).

The relationship between CQIs and scheduling requests (SRs) is the same as the relationship shown in FIG. 15B, when the synchronous random access channel is used. Similar to the case of assigning a dedicated channel for each user, synchronization can be maintained using the synchronous random access channel during a period of no CQI feedback. It should be noted that radio resources for the synchronous random access channel may be determined in advance in the mobile communication system or may be adaptively determined based on the communication environment.

As described above, the mobile station 200 can transmit the scheduling request during a period of no CQI report to maintain synchronization.

According to an embodiment of the present invention, the mobile station which desires to transmit uplink data can transmits scheduling requests without the need for synchronization, because synchronization with the base station is maintained. Accordingly, time between the generation of the uplink data and the transmission of the scheduling request can be reduced. The base station can decode the scheduling requests and specify a radio resource to the mobile station.

A mobile station, a base station, and a method of transmitting an uplink scheduling request in accordance with an embodiment of the present invention are applicable to any mobile communication system.

This international patent application is based on Japanese Priority Application No. 2006-169453 filed on Jun. 19, 2006, Japanese Priority Application No. 2007-001859 filed on Jan. 9, 2007, and Japanese Priority Application No. 2007-026182 filed on Feb. 5, 2007, the entire contents of which are incorporated herein by reference.

What is claimed is:

1. A mobile station in a mobile communication system which uses single-carrier FDMA as an uplink radio access scheme and in which multiple frequency blocks are arranged in a frequency direction and repeated in a time direction within an uplink system band, comprising:
    a receiving unit configured to receive from a base station both a transmission interval between scheduling requests and an instruction regarding a frequency of a frequency block in which a scheduling request is to be transmitted, the scheduling request being a signal transmitted before transmission of uplink data;
    a mapping unit configured to map a control channel including the scheduling request onto a frequency block corresponding to each timing of the transmission interval and the frequency which are received by the receiving unit; and
    a transmitting unit configured to transmit a signal of the control channel mapped by the mapping unit,
    wherein the mapping unit maps the control channel such that the control channel is code-multiplexed with a scheduling request from another mobile station by means of cyclic shifting of a Constant Amplitude Zero Auto-Correlation (CAZAC) sequence,
    wherein the mapping unit maps the control channel such that the control channel includes plural CAZAC sequences with a sequence length of twelve.

2. The mobile station as claimed in claim 1, wherein the mapping unit multiplexes the scheduling request and a CQI.

3. A transmission method in a mobile station in a mobile communication system which uses single-carrier FDMA as an uplink radio access scheme and in which multiple frequency blocks are arranged in a frequency direction and repeated in a time direction within an uplink system band, comprising the steps of:
    receiving from a base station both a transmission interval between scheduling requests and an instruction regarding a frequency of a frequency block in which a scheduling request is to be transmitted, the scheduling request being a signal transmitted before transmission of uplink data;
    mapping a control channel including the scheduling request onto a frequency block corresponding to each timing of the received transmission interval and the received frequency; and
    transmitting a signal of the mapped control channel,
    wherein the step of mapping comprises mapping the control channel such that the control channel is code-multiplexed with a scheduling request from another mobile station by means of cyclic shifting of a Constant Amplitude Zero Auto-Correlation (CAZAC) sequence, and
    wherein the step of mapping comprises mapping the control channel such that the control channel includes plural CAZAC sequences with a sequence length of twelve.

4. The transmission method as claimed in claim 3, wherein the step of mapping comprises multiplexing the scheduling request and a CQI.

5. A mobile communication system which uses single-carrier FDMA as an uplink radio access scheme and in which multiple frequency blocks are arranged in a frequency direction and repeated in a time direction within an uplink system band, comprising:
    a base station configured to transmit to a mobile station both a transmission interval between scheduling requests and an instruction regarding a frequency of a frequency block in which a scheduling request is to be transmitted, the scheduling request being a signal transmitted before transmission of uplink data; and
    the mobile station configured to map a control channel including the scheduling request onto a frequency block corresponding to each timing of the transmission interval and the frequency which are received from the base station, and transmit a signal of the control channel to the base station,
    wherein the mobile station maps the control channel such that the control channel is code-multiplexed with a scheduling request from another mobile station by means of cyclic shifting of a Constant Amplitude Zero Auto-Correlation (CAZAC) sequence, and
    wherein the mobile station maps the control channel such that the control channel includes plural CAZAC sequences with a sequence length of twelve.

* * * * *